(12) United States Patent
Petersen et al.

(10) Patent No.: US 10,229,372 B2
(45) Date of Patent: Mar. 12, 2019

(54) METHOD FOR RESCHEDULING FLIGHTS AFFECTED BY A DISRUPTION AND AN AIRLINE OPERATIONS CONTROL SYSTEM AND CONTROLLER

(71) Applicant: Taleris Global LLP, Hampshire (GB)

(72) Inventors: Jon David Petersen, Austin, TX (US); Michael Arguello, Austin, TX (US); Jonathan Mark Dunsdon, Murphys, CA (US); Marc Joseph Anderson, Austin, TX (US)

(73) Assignee: Taleris Global LLP, Hampshire (GB)

( * ) Notice: Subject to any disclaimer, the term of this patent is extended or adjusted under 35 U.S.C. 154(b) by 540 days.

(21) Appl. No.: 14/713,325

(22) Filed: May 15, 2015

(65) Prior Publication Data

US 2016/0335567 A1  Nov. 17, 2016

(51) Int. Cl.
| | |
|---|---|
| *G06Q 10/02* | (2012.01) |
| *G06Q 50/14* | (2012.01) |
| *G06Q 10/04* | (2012.01) |
| *G06Q 10/06* | (2012.01) |
| *G06Q 50/30* | (2012.01) |

(52) U.S. Cl.
CPC ......... *G06Q 10/025* (2013.01); *G06Q 10/047* (2013.01); *G06Q 10/06312* (2013.01); *G06Q 50/14* (2013.01); *G06Q 50/30* (2013.01)

(58) Field of Classification Search
USPC .......................................................... 705/6
See application file for complete search history.

(56) References Cited

U.S. PATENT DOCUMENTS

| | | | |
|---|---|---|---|
| 6,314,361 | B1 | 11/2001 | Yu et al. |
| 6,721,714 | B1 | 4/2004 | Baiada et al. |

(Continued)

FOREIGN PATENT DOCUMENTS

| | | |
|---|---|---|
| JP | H09-134500 A | 5/1997 |
| JP | 2013-164672 A | 8/2013 |
| JP | 2013-177120 A | 9/2013 |

OTHER PUBLICATIONS

Office Action issued in connection with corresponding CA Application No. 2929757 dated Mar. 21, 2017.

(Continued)

*Primary Examiner* — Garcia Ade
(74) *Attorney, Agent, or Firm* — Taleris Global LLP; William Andes

(57) ABSTRACT

An airline operations system, controller and method reschedules flights affected by a disruption that precludes a planned schedule for the flights. The method includes obtaining data related to a scheduled origination and a scheduled destination for each of a set of passengers scheduled on the flights, generating a passenger connection network of connections between the scheduled origination and the scheduled destination for a subset of the set of passengers, applying at least one criterion to the passenger connection network and rescheduling at least one connecting flight based on the criteria. The system and controller solves a network flow problem to reschedule a subset of connecting flights to have a delayed projected departure time. Resulting output can include the set of delayed flights along with modified projected departure times, a set of flight cancellations and a set of passengers with missed connections.

18 Claims, 9 Drawing Sheets

(56) References Cited

U.S. PATENT DOCUMENTS

| | | |
|---|---|---|
| 7,734,493 B1 | 6/2010 | Anbil |
| 8,554,459 B2 | 10/2013 | Johnson et al. |
| 8,645,177 B2 * | 2/2014 | Pachon ................ G06Q 10/04 705/7.12 |
| 2005/0071206 A1 | 3/2005 | Berge |
| 2014/0052481 A1 * | 2/2014 | Monteil ................ G06Q 10/02 705/5 |
| 2014/0278615 A1 | 9/2014 | Ince et al. |
| 2015/0019065 A1 | 1/2015 | Bollapragada et al. |

OTHER PUBLICATIONS

Disruption Management in Operations Control Challenges, Concept and Solution Benefits, Mainz, 2005.
Notification of Reasons for Refusal issued in connection with corresponding JP Application No. 2016-094215 dated Sep. 5, 2017.
Notification of Reasons for Refusal issued in connection with corresponding JP Application No. 2016-094215 dated Dec. 5, 2017.

\* cited by examiner

METHOD FOR RESCHEDULING FLIGHTS AFFECTED BY A DISRUPTION AND AN AIRLINE OPERATIONS CONTROL SYSTEM AND CONTROLLER

BACKGROUND OF THE INVENTION

Common sources of disruption to airline schedules include crew absences, mechanical failure, inclement weather, etc. Disruption events can occur without any notification and with immediate effect such as when an airport closes due to a radar failure. Other disruption events, such as might occur because of deteriorating weather conditions, can have a more gradual effect on airline schedules. Planned airport or airspace closures cause disruption events with a defined time period where the defined time period can be static or can dynamically change during the disruption event.

In response to a disruption event, airlines reschedule their operations by implementing recovery plans for schedule, aircraft, crews and passengers that can include delaying or canceling flights, normally via an airlines operations control center (AOCC). Operators in an AOCC of a major airline manage the execution of hundreds or thousands of flights a day and adjust in real time the movements of the aircraft and crewmembers of the airline to minimize costly delays and cancellations, while complying with complex maintenance and routing constraints. These operators are responsible for preparing flight plans, adjusting the airline schedule including flight schedule, departure slot assignments, aircraft assignments and crew assignments in response to various disruption events. A challenge for major airlines is to limit inefficiency in the airline and manage information efficiently to alleviate the impact of unforeseen schedule disruptions.

BRIEF DESCRIPTION OF THE INVENTION

In one aspect, an embodiment relates to a method of rescheduling flights. The method includes obtaining itinerary data related to flights from a scheduled origination to a scheduled destination for a set of passengers; generating, based on the data, a passenger connection network for a subset of the set of passengers that includes at least one intermediate connecting flight having a first projected departure time; creating in the passenger connection network at least one alternate intermediate connecting flight having a second projected departure time that is after the first projected departure time; adding a set of connections to the passenger connection network between the scheduled origination and the scheduled destination for the subset of the set of passengers wherein the added set of connections includes the at least one alternate intermediate connecting flight; applying at least one criterion to the passenger connection network with the added connections; and rescheduling the subset of the set of passengers to the at least one alternate intermediate connecting flight at the second projected departure time based on the at least one criterion.

In another aspect, an embodiment relates to an airline operations control system. The system includes a computing device including a memory configured to store instructions; and a processor configured to execute the instructions. The instructions perform a method comprising obtaining itinerary data related to flights from a scheduled origination to a scheduled destination for each of a set of passengers; generating, based on the data, a passenger connection network for a subset of the set of passengers that includes at least one intermediate connecting flight having a first projected departure time; creating in the passenger connection network at least one alternate intermediate connecting flight having a second projected departure time after the first projected departure time; adding a set of connections to the passenger connection network between the scheduled origination and the scheduled destination for the subset of the set of passengers wherein the added set of connections includes the at least one alternate intermediate connecting flight; applying at least one criterion to the passenger connection network with the added connections; and rescheduling the subset of the set of passengers to the at least one alternate intermediate connecting flight at the second projected departure time based on the at least one criterion.

In another aspect, an embodiment relates to a controller in communication with a database containing data related to a scheduled origination and a scheduled destination for each of a set of passengers scheduled on aircraft flights. The controller has software configured to access and retrieve the data; generate a passenger connection network of connections between the scheduled origination and the scheduled destination for a subset of the set of passengers wherein the connections include at least one connecting flight that is not direct between the scheduled origination and the scheduled destination, wherein the at least one connecting flight has a first projected departure time; create at least one copy of the at least one connecting flight having a second projected departure time later than the first projected departure time; add connections to the passenger connection network between the scheduled origination and the scheduled destination for the subset wherein the added connections include the at least one copy of the at least one connecting flight; apply at least one criterion to the passenger connection network with the added connections; and reschedule the at least one connecting flight to at least one second projected departure time based on the at least one criterion.

DESCRIPTION OF EMBODIMENTS OF THE INVENTION

Figure 1:
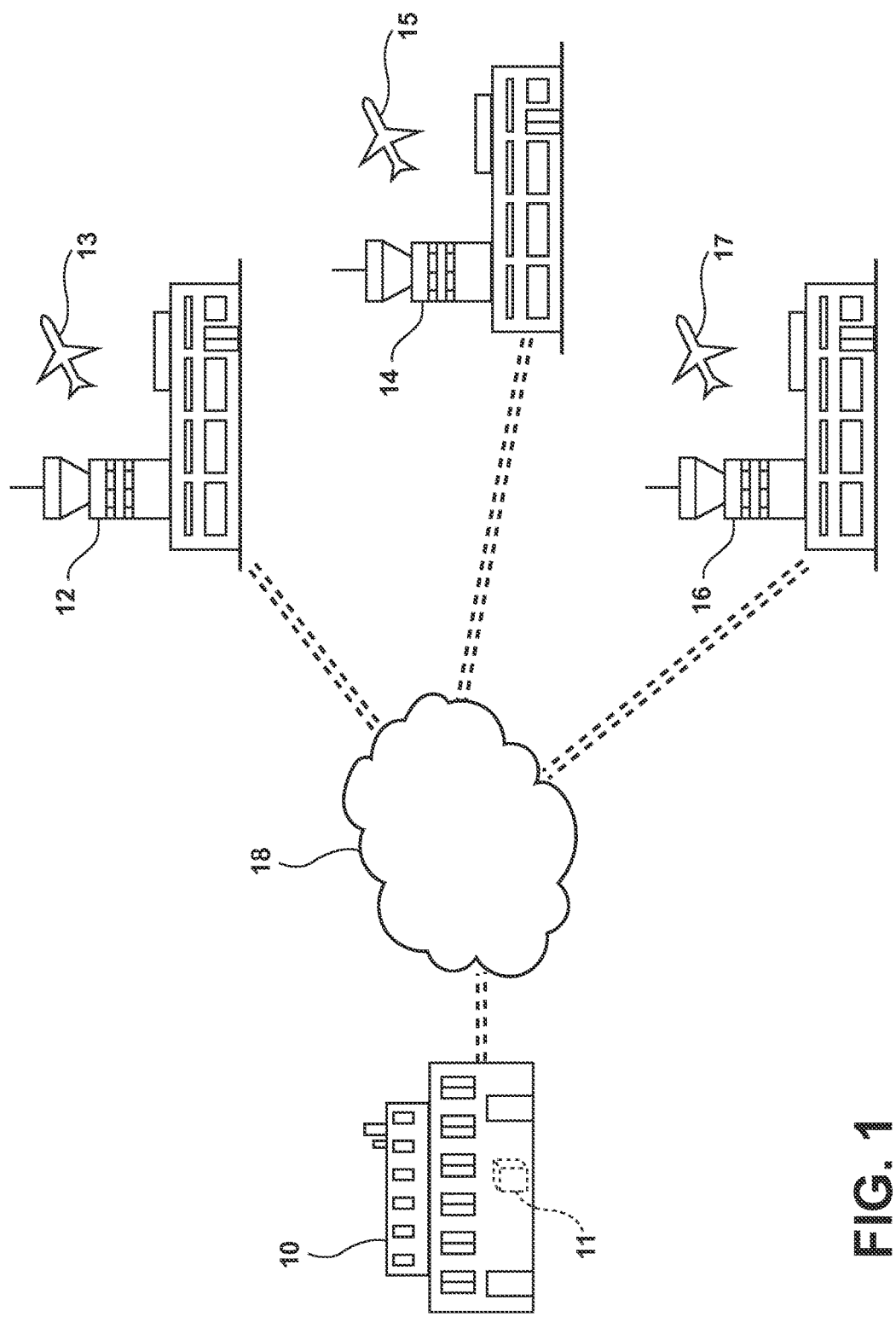
FIG. 1 illustrates an airline operations center that can practice embodiments of the invention and is in communication with several airports to reschedule flights during a disruption event.

It will be understood that details of environments that can implement embodiments of the invention are set forth in order to provide a thorough understanding of the technology described herein. It will be evident to one skilled in the art, however, that the exemplary embodiments can be practiced without these specific details. The drawings illustrate certain details of specific embodiments that implement a module or method, or computer program product described herein. However, the drawings should not be construed as imposing any limitations that can be present in the drawings. The method and computer program product can be provided on any machine-readable media for accomplishing their operations. The embodiments can be implemented using an existing computer processor, or by a special purpose computer processor incorporated for this or another purpose, or by a hardwired system.

As noted above, embodiments described herein can include a computer program product comprising machine-readable media for carrying or having machine-executable instructions or data structures stored thereon. Such machine-readable media can be any available media, which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium that can be used to carry or store desired program code in the form of machine-executable instructions or data structures and that can be accessed by a general purpose or special purpose computer or other machine with a processor. When information is transferred or provided over a network or another communication connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data, which cause a general-purpose computer, special purpose computer, or special purpose processing machines to perform a certain function or group of functions.

Embodiments will be described in the general context of method steps that can be implemented in one embodiment by a program product including machine-executable instructions, such as program codes, for example, in the form of program modules executed by machines in networked environments. Generally, program modules include routines, programs, objects, components, data structures, etc. that have the technical effect of performing particular tasks or implement particular abstract data types. Machine-executable instructions, associated data structures, and program modules represent examples of program codes for executing steps of the method disclosed herein. The particular sequence of such executable instructions or associated data structures represent examples of corresponding acts for implementing the functions described in such steps.

Understanding the embodiments disclosed herein will be aided by an initial explanation of an airline environment and the problems faced when airline operations personnel make decisions with respect to disruption events. As airline networks can have hundreds of aircraft and thousands of crewmembers and extensive maintenance operations within their purview and take into consideration a wide variety of information it will be understood that FIG. 1 only schematically illustrates a very simplified version of an airline and the information which can be taken into consideration. However, for simplicity of explanation, the exemplary situation of FIG. 1 is useful to explain the inventive concepts without undue complexity. More specifically, an airline having three aircraft 13, 15, and 17, which are respectively located at a first airport 12, a second airport 14 and a third airport 16 and an airlines operations control center (AOCC) 10 are illustrated. While the aircraft 13, 15, and 17 are illustrated as being identical, it will be appreciated that the aircraft 13, 15, and 17 can be different makes and models, with differing functionality and capacity, and thus can not necessarily be optimal to be swapped with one another. The AOCC 10 is in communication with the airports 12, 14, 16 by a computer network 18 which can, for example, be a local area network or a larger network such as the internet.

As aircraft have planned routes, consider a scenario where aircraft 13 is scheduled to fly from airport 12 to airport 14 and then to airport 16. Aircraft 15 is scheduled to fly from airport 14 to airport 16 and back to airport 14, and aircraft 17 is scheduled to fly from airport 16 to airport 12. Passengers aboard the aircraft typically have diverse itineraries with various connecting flights to convey them from their sources to their destinations. Consequently, while some of the passengers departing from airport 12 can have a scheduled destination of airport 14 or 16, others will arrive at these airports as an intermediate destination to connect to one or more additional flights. Therefore, if prior to the departure of the aircraft 13, the first airport 12 experiences a disruption event, aircraft operations personnel of the AOCC 10 can either delay the flight until the disruption event is resolved at the airport 12 or cancel the flight, which can result in large costs to the airline and general customer dissatisfaction.

To reschedule operations, the AOCC 10 can employ a procedure for operations recovery where operations recovery is a method to determine flight delays and cancellations in response to a disruption event. Embodiments of the system and method for operations recovery presented herein include a model that considers delay options for outbound flight legs to hold for connecting passengers. An operations recovery solver for processing the model can be implemented on a computing device 11 located at the AOCC. The computing device 11 is capable of executing software to assist personnel at the AOCC in responding to the disruption event. For brevity, the computing device 11 executing software configured to perform operations recovery procedures is referred to herein as a "processor."

Figure 2:
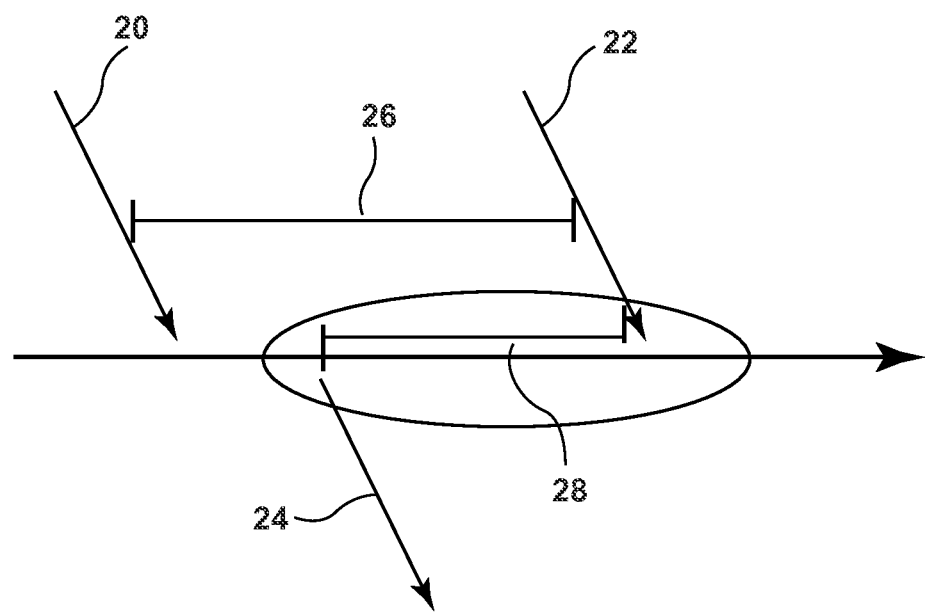
FIG. 2 is a diagram graphically depicting a passenger connection from a scheduled inbound flight to an outbound flight where the inbound flight can be delayed or canceled.

FIG. 2 is a diagram graphically depicting a passenger connection from a scheduled inbound flight 20 to an outbound flight 24 where the inbound flight can be delayed or canceled. When a late inbound flight 22 arrives a duration of time 26 after the listed arrival time of the scheduled inbound flight 20, passengers can experience a misconnection to their outbound flight 24 if the late inbound flight 22 arrives after the departure time of the outbound flight (as shown by the duration 28). Conventional operations recovery addresses missed passenger connections by penalizing a late inbound flight 22 that arrives after the scheduled departure time for the outbound flight 24. However, conventional operations recovery enforces the penalty even if the outbound flight 24 is also delayed such that a passenger can make the connection between the late inbound flight 22 and the delayed outbound flight. That is, conventional operations recovery does not include a model where the outbound flight 24 can be delayed to reduce the penalty associated with misconnection. In other words, conventional operational recovery includes an objective function that is only an approximation that considers an outbound flight's scheduled departure time without considering the relationship between the flight times of a passenger's connecting flight.

Figure 3:
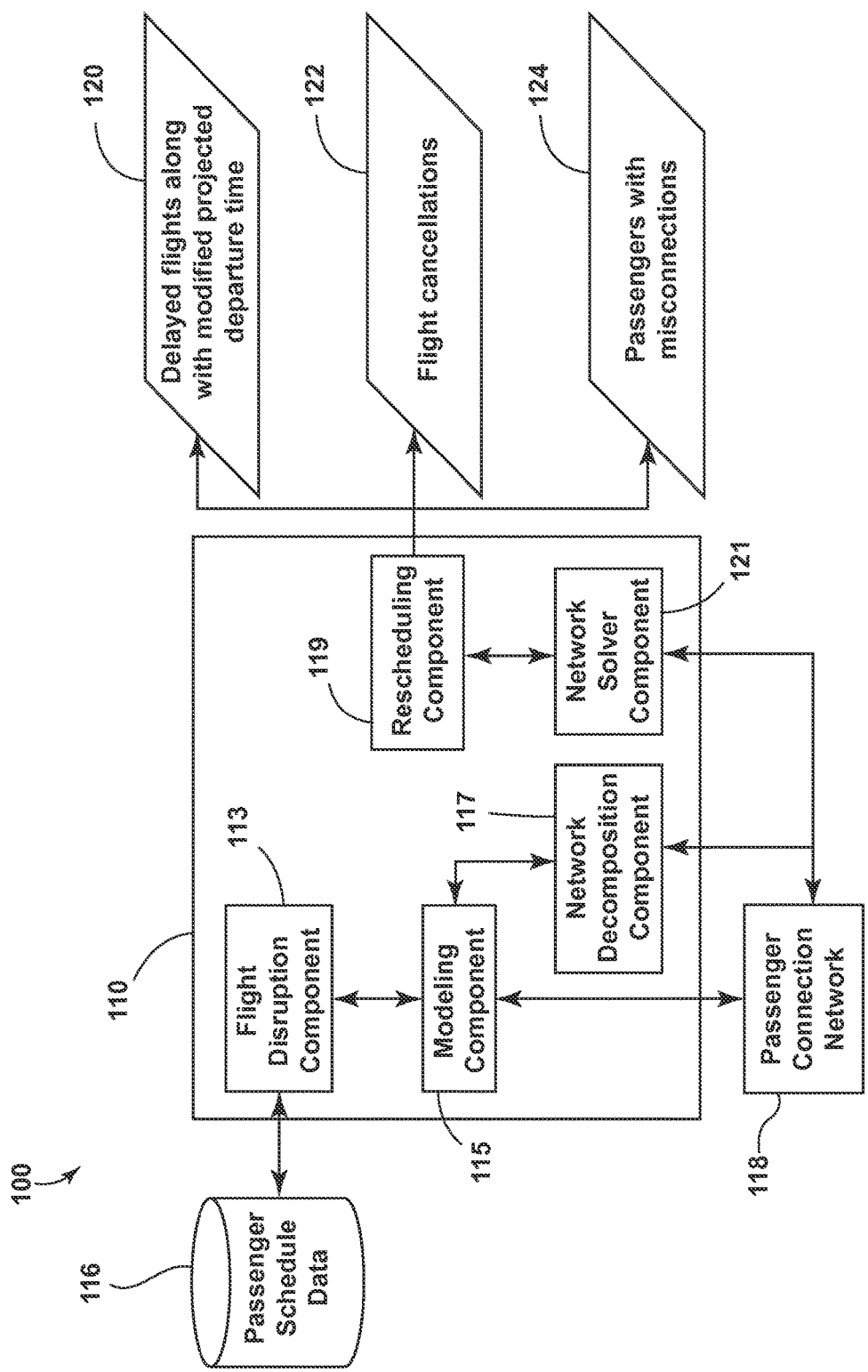
FIG. 3 is a block diagram illustrating an airline operations control system and controller according to an embodiment of the invention.

Referring now to FIG. 3, a block diagram is shown that illustrates an airlines operations control system 100 and, particularly, a controller 110 configured to reschedule flights affected by a disruption according to embodiments of the invention. The airline operations control system 100 includes a computing device shown in FIG. 3, but not limited to, a controller 110 (and herein referred to as "controller"). The controller 110 can include, but is not limited to a memory configured to store instructions for execution by a processor. The instructions and their storage can include any suitable computing modalities, architecture and framework including, but not limited to hardware, software and combinations thereof. The controller 110, by way of a flight disruption component 113 is configured to obtain data related to the scheduled origination and destination for each of a set of passengers scheduled on the flights. The data is stored on any suitable computing storage medium including, but not limited to a database of passenger schedule data 116.

The controller 110 can include a modeling component 115 to generate a passenger connection network 118. The passenger connection network 118, as described below, can map the connections between the scheduled origination and the scheduled destination for a subset of the set of passengers on the flights in the network. The rescheduling component 119 can reschedule flights based on a computational analysis of the passenger connection network 118 by the network decomposition component 117 and the network solver component 121 to improve the overall network flow of passengers through the passenger connection network 118. The controller 110, by way of the rescheduling component 119 can output data related to the analysis and updated schedule. The outputs can include, but not be limited to, data related to the set of delayed flights 120 along with modified projected departure times, a set of flight cancellations 122 and a set of passengers with missed connections 124.

To generate and exploit a model that considers delay options for outbound flight legs, a flight disruption component 113 obtains, receives, or otherwise acquires data related to passenger origination and destination (passenger schedule data 116). The flight disruption component 113 can construct, determine or otherwise generate a passenger connection network 118 based on the passenger itinerary data, and determine, based in part on the passenger connection network 118, a number of passengers with a given itinerary, a set of flights that are delayed, a set of modified scheduled departure times, a set of flight cancellations, and a set of possible origination and destination passenger flows with misconnections identified. For instance, the flight passenger connection network 118 can include a flow network which is a directed graph, where the nodes are flight legs and arcs represent valid connections.

For example, in one embodiment, a modeling component 115 can generate a passenger connection network 118 that includes a flight network having a quantity of scheduled flights (V) represented as legs, and a quantity of scheduled [of] passenger connections (A) represented as nodes. For instance, the flight network can be denoted as $G^P$ (V, A). For a set of inbound flight connections, the modeling component 115 can identify candidate outbound flights, and add the corresponding flight arc to the passenger connection network 118. The resulting passenger connection network 118 can be denoted as (V, A). The network decomposition component 117 then decomposes the network (e.g., $CI^P$) into its connected components. For instance, the network decomposition component 117 can, for m 2 1 connected components, iterate through connected components $a1^P \ldots b$}. For the connected components $ai^P$, a network solver component 121 can expand the network and determines a strategy for moving the passengers through the network of nodes. For example, the network solver component 121 can solve a modified minimum cost multicommodity network flow problem (MCNFP) over where the commodity in the MCNFP corresponds to a unique passenger itinerary.

Figure 4:
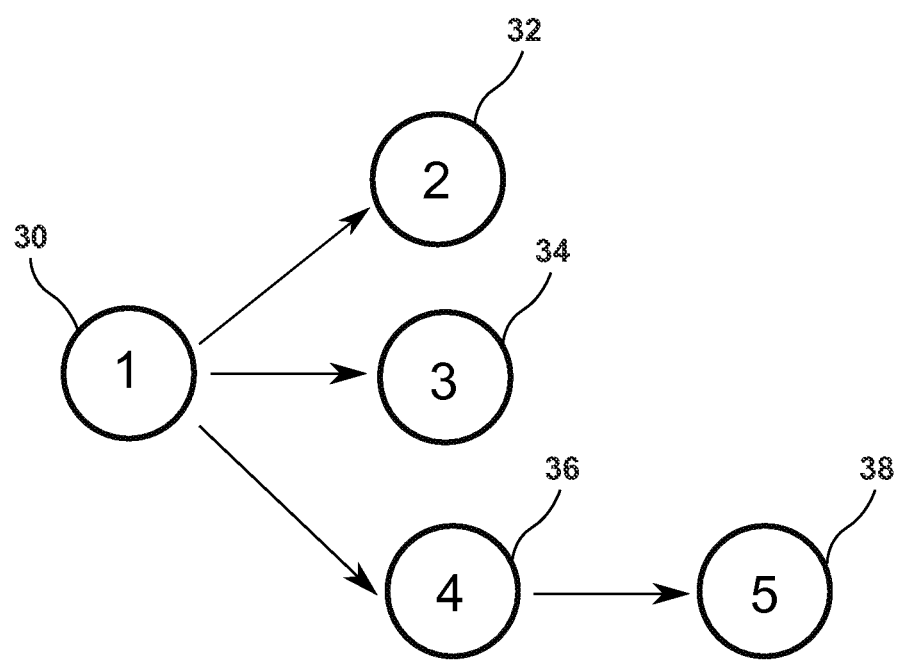
FIG. 4 illustrates a flight network with five flight legs and four passenger connections.

As described above, $\tilde{G}^P$ is a passenger connection network whose arcs connect candidate flight legs. FIG. 4 illustrates a simple flight network with five flight legs and four passenger connections. The initial flight leg 30 connects to three flight legs 32, 34, 36. The flight leg 36 connects to flight leg 38, indicating that some passengers can connect to the flight leg 38 from the intermediate flight leg 36.

Figure 5:
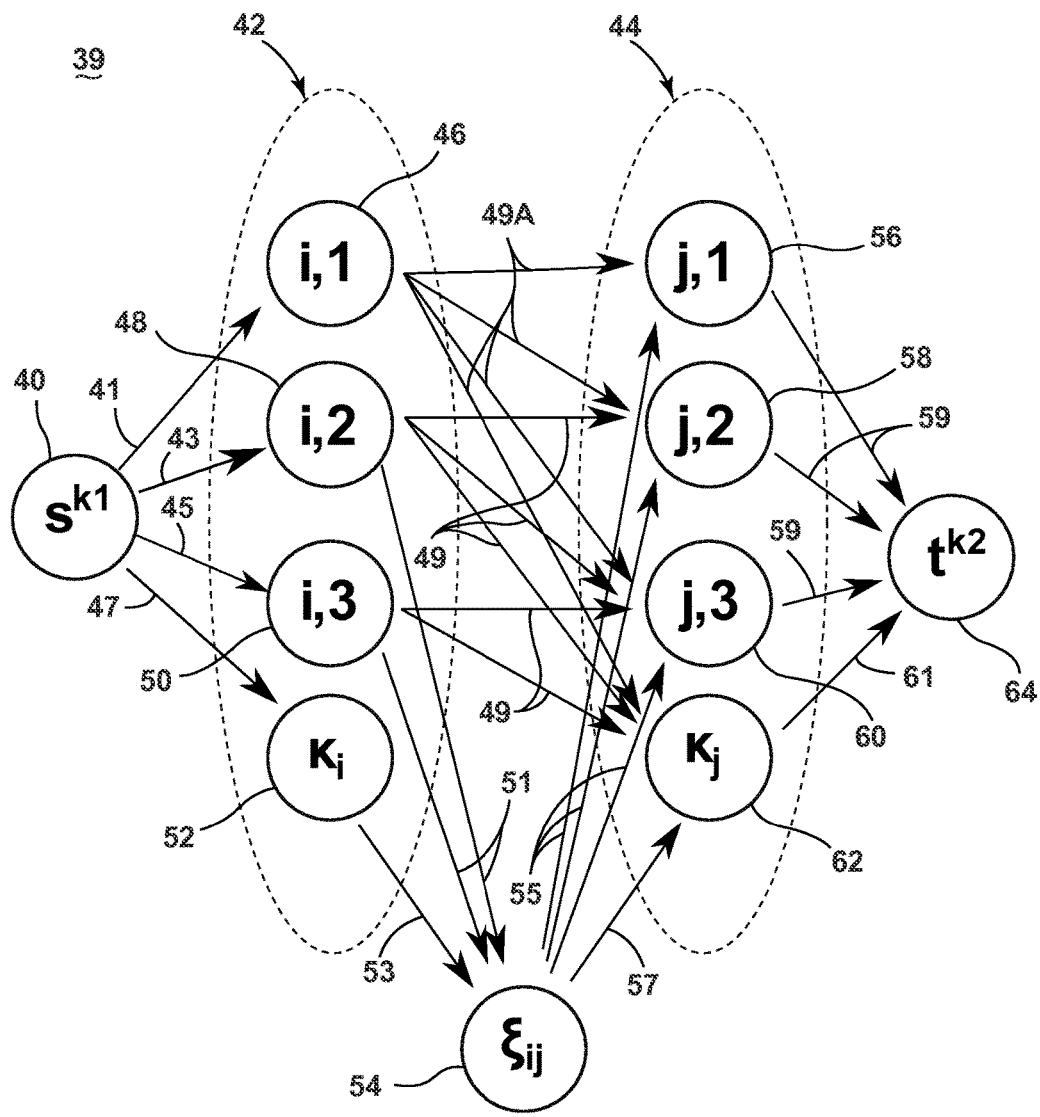
FIG. 5 illustrates a passenger connection network according to an embodiment of the invention.

Referring now to FIG. 5, for every passenger connection, the modeling component constructs a passenger connection network 39 with a set of nodes and arcs. For example, the passenger connection network 39 can include six classes of nodes. A source node 40 exists for every scheduled flight leg that is an initial flight for a connecting passenger itinerary. A sink node 64 exists for every scheduled flight leg that is a terminating flight for a connecting passenger itinerary. That is, the sink node 64 represents the final destination of a passenger. For every flight leg 42 and 44 having a first projected departure time, flight nodes 46, 48, 50 and 56, 58, 60 are intermediate alternatives of the respective flight leg 42 and 44 associated with a delay option, for example, every flight leg having a second projected departure time later than the first projected departure time. That is, flight leg 42 can depart at its scheduled time per flight node 46, can be delayed a first duration per flight node 48 or can be delayed a longer second duration per flight node 50. Every flight leg 42 and 44 includes a cancellation node 52 and 62 to represent the cancellation of a given flight, i.e., the second projected departure time can include "null" or a cancellation. Every intermediate alternative represents a possible delay option where the second projected departure time can be predetermined or selected according to a schedule. A disruption node 54 exists for every flight connection to track passengers whose schedules have been disrupted due to misconnections or flight cancellations. Additionally, when the passenger connection network 39 includes multiple sink nodes, a super sink node connects to the sink nodes.

In addition, the passenger connection network 39 can include different types of connections between nodes, which are represented as arcs in FIG. 5. An arc 41, 43, 45 connects the source node 40 to a respective initial flight node 46, 48, 50. An arc 47 connects the source node 40 to the initial flight cancellation node 52. Arcs connect the inbound flight nodes 46, 48, 50 to the outbound flight nodes 56, 58, 60. An arc 49 connects inbound flight nodes 46, 48, 50 to outbound flight cancellation node 62. For every inbound flight node that does not connect to a departure flight node, an arc 51 connects the inbound flight node to the disruption node 54. An arc 53 connects the inbound flight cancellation node 52 to the disruption node 54. An arc 55 connects the disruption node 54 to the outbound flight nodes 56, 58, 60. An arc 57 connects the disruption node 54 to the outbound flight cancellation node 62. An arc 59 connects the outbound flight nodes 56, 58, 60 to the sink node 64. An arc 61 connects the disruption node 62 to the sink node 64. Additionally, when the passenger connection network 39 includes multiple sink nodes, an arc connects the sink nodes to the super sink node.

FIG. 5 shows an example passenger connection network 39 with connection from flight i 42 to flight j 44. That is, for example, passengers arrive to some airport aboard flight i 42 and depart by flight j 44. The flight disruption component or the modeling component can model the passenger connection network 39 with the each flight having a first projected departure time, and three departure options for the flights, with the three departure options having a second projected departure time later than the first projected departure time. The first flight time (as in flight nodes 46 and 56) aligns with the projected departure time for the respective flight. Here, it is assumed that flight i 42 constitutes an initial flight in some itinerary k1 and, consequently, its nodes are incident to some source node $s^{k1}$ 40. Similarly, flight j 44 is a terminal flight for some itinerary k2 and is connected to $t^{k2}$, the sink node 64. Note that itinerary k2 can be itinerary k1.

The disruption node $\xi_{ij}$ 54 is an auxiliary node that tracks any passengers who experience a disruption (i.e. delay or cancellation) with a scheduled connection from flight i 42 to flight j 44. Because the first inbound flight node 46 connects via connection arcs 49A to the outbound flight nodes 56, 58, 60, no arc connects the first inbound flight node 46 to the disruption node 54. However, if the second inbound flight node 48 (delayed from the first inbound flight node 46) were to connect to the first outbound flight node 56, then a misconnection occurs, hence the processor connects the second inbound flight node 48 to the disruption node 54 by arc 51 and ensures balance for the second inbound flight node 48. Because an inbound flight cancellation automatically incurs a disruption, the arc 53 connects the cancellation node 52 to the disruption node 54. Similarly, an arc 55 connects the disruption node 54 to the outbound flight nodes 56, 58, 60 and an arc 57 connects to the cancellation node 62.

Based on the model formulation, the network solver component can apply at least one criterion to the passenger connection network 39 to determine whether to fly, delay or cancel a flight and how to route passengers through the passenger connection network 39 given flight decisions. The network solver component determines whether to fly, delay or cancel a flight by selecting nodes for every flight leg based in part on the set of criteria. The set of criteria form the standard by which the network solver determines whether to fly, delay or cancel a flight and form the basis for an objective analysis of the passenger connection network 39. The set of criteria can be any criterion used for an airline network flow analysis including but not limited to, aircraft fuel cost, overall airline fuel cost, average per flight departure delay duration, maximum flight departure delay for all flights in the network, per flight revenue, overall flight revenue, the total number of flight cancellations, total flight disruptions for a predetermined set of passengers, etc. The network solver component can implement one or more of the set of criteria with an objective to maximize or minimize one or more of the set of criteria The network solver component determines how to route passengers through the passenger connection network 39 based on a flow analysis of the arcs in the passenger connection network 39. The objective of the passenger flow problem is to determine appropriate tradeoff costs associated with delay and cancellation operations and passenger misconnections. At the AOCC, the processed results of the analysis of the passenger connection network 39 can be integrated with other operations recovery models and with other objectives such as can be related to tail swaps, ferries, etc.

The network solver component enforces the criteria on the passenger connection network by associating costs (i.e. weights or penalties) with the decision variables corresponding to nodes and arcs. With respect to the nodes, in one implementation, the network solver component associates a cost with the flight delay and cancellations nodes (and not the flight nodes associated with the scheduled times). In one implementation, the network solver component can associate a cost to the delay and cancellation nodes, including, but not limited to, a cost that is non-decreasing as a function of the severity of the delay. It is contemplated that other cost functions as applied to the nodes can be implemented.

Types of costs the network solver component can associate with the arcs include, but are not limited to, broken passenger itinerary costs and additional delay costs. The network solver component assigns a broken passenger itinerary cost to any arc incident to the disruption node 54 which shows a passenger cannot be assigned an itinerary. The broken passenger itinerary cost penalizes solutions that cause passenger misconnections. To conserve flow for the passenger connection network 39, any nonzero valued flow input to a node must also flow out. Therefore, to avoid double counting, the network solver component imposes penalties on the arcs inbound to the disruption node 54 from inbound flight nodes that miss the eligible outbound connections. Penalties are also introduced into arcs from the final cancellation node to the sink node 61 as the passenger is assured to be disrupted from a cancellation.

The network solver component can assign additional delay costs to arcs between flight nodes that result in a longer connection time than the scheduled connection time. That is, the scheduled connection time as represented by the arc connecting the scheduled inbound flight node 46 to the scheduled outbound flight node 56 is the scheduled duration of time between the arrival of the inbound flight 42 and the departure of the outbound flight 44. The arc 49 connecting the inbound flight nodes 46, 48, 50 to the outbound flight nodes 56, 58, 60 includes a duration of time between the arrival of the inbound flight node and the departure of the outbound flight node. For a connection arc that incurs a duration longer than the scheduled duration, the network solver component can assign a penalty that is a function of the duration of the connection time. In one implementation, the network solver component only applies the additional delay cost to routes that follow the same airport pairs as on the original itinerary path.

The network solver component can enforce other costs depending upon the implementation. For example, the processor can assign a cost to arcs inbound to undesired flight nodes to penalize solutions that have adverse effects on the airline operations. In this example, the cost can be applied to misconnecting passengers who would be rescheduled on a flight where the aircraft is not explicitly present in an implemented operations model. In another non-limiting example, the network solver component can enforce a cost on delays that affect local passengers (i.e. passengers with a single itinerary). In this way, the processor balances the total cost incurred by local and connection passengers.

To solve the passenger connection network 39 for one or more criterion as enforced by the cost functions, the network solver component superimposes passenger itineraries into a single time-space network to solve a multi-commodity network flow model where original itineraries correspond to a commodity. The network solver component can append an operations model by appending new variables and constraints to passenger connection network 39.

The network solver component can apply the criterion set forth above to the passenger connection network and solve a multi-commodity network flow problem. In one non-limiting formulation of the multi-commodity network flow problem, the network solver component is configured such that the objective of the problem is to minimize the costs incurred from delays, cancellations and passenger disruptions. In another non-limiting example, the objective of the problem is to maximize revenue. The network solver component can solve for one or more objectives with any suitable optimization framework, including but not limited to mixed integer linear programming (MILP).

Figure 6:
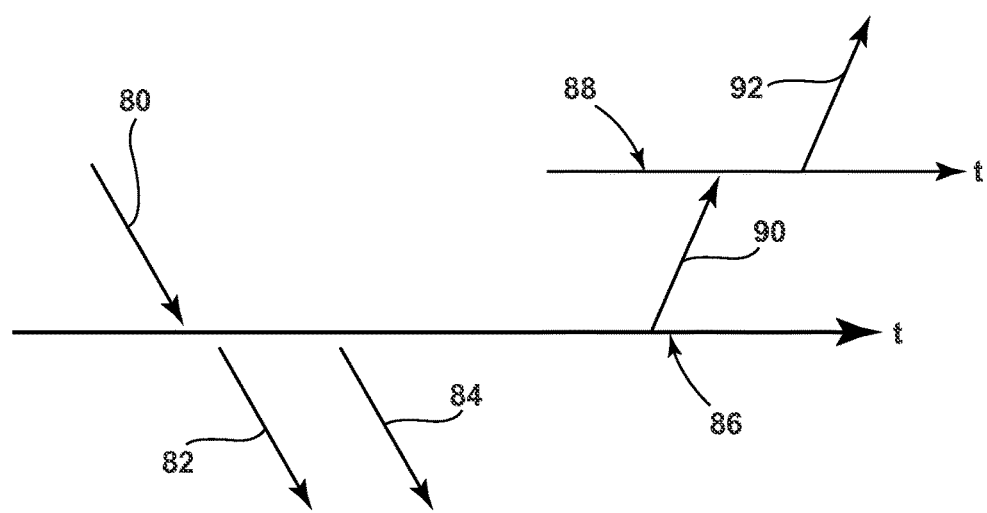
FIG. 6 illustrates an example of a flight network where a disruption event can be mitigated by embodiments of the invention.

Referring now to FIG. 6, an example flight schedule can provide a simple example of a passenger connection network. The flight schedule includes five flights, a first flight 80 arriving at a first airport 86 (indicated by the lower horizontal axis). Passengers on the first flight 80 connect at the first airport to one of three outbound flights 82, 84, 90 each scheduled with different departure times (as indicated by the intersection of flights 82, 84, 90 with the lower horizontal axis). The passengers connecting on the first two outbound flights 82, 84 arrive at their destinations without additional connections. Passengers on the third outbound flight 90 are scheduled to connect with a fifth flight 92 at a second airport 88 (indicated by the upper horizontal axis). Additionally, passengers originating from the first airport 86 connect from the flight 90 to the fifth flight 92 at the second airport 88.

The example includes five unique itineraries for 34 passengers as in Table 1. The first column indicates the number of passengers that share an itinerary. The second column lists the itinerary according to the scheduled flights for the passengers. Note that the list refers to the first flight 80 as "1", the first outbound flight 82 as "2", the second outbound flight 84 as "3", the third outbound flight 90 as "4", and the outbound flight 92 from the second airport 88 as "5".

TABLE 1

| Number of passengers | Itinerary |
|---|---|
| 9 | (1, 2) |
| 13 | (1, 3) |
| 6 | (1, 4) |
| 2 | (1, 4, 5) |
| 4 | (4, 5) |

Figure 7:
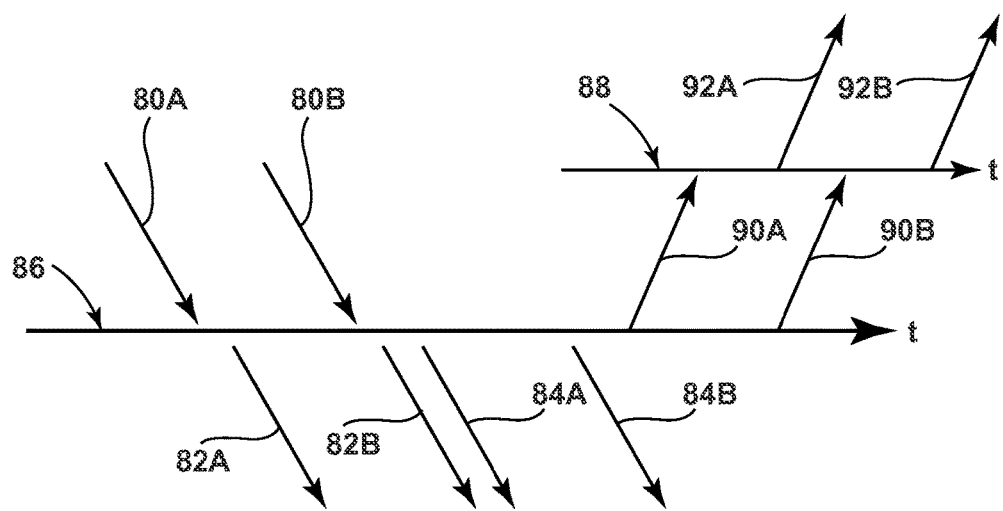
FIG. 7 illustrates the flight network of FIG. 6 where flight delays are considered to mitigate a disruption event by embodiments of the invention.

The flight disruption component or the modeling component constructs the passenger connection network from the flight network shown in FIG. 5 and the passenger itinerary data shown in TABLE 1 by adding the source nodes, the flight nodes, the sink nodes, the connecting arcs etc. as described above. As part of the example, the flight disruption component or the modeling component includes a disruption event and consequently adds delay options for the flights. The delay options for the flight network from FIG. 6 are illustrated in FIG. 7. The flights include a scheduled option (where the flight element is indicated by an appended "A") and a delay option (where the flight element is indicated by an appended "B"). So, the flight disruption component or the modeling component allows the inbound flight 80 to arrive at its scheduled time as in 80A or at a re-scheduled delay time 80B. Considering the nine passengers scheduled on the first outbound flight 82, note that if the network solver component selects a delay for the first inbound flight 80B and maintains the original schedule departure for the first outbound flight 82A, the nine passengers will experience a misconnection. As described above, the flight disruption component or the modeling component tracks misconnections by adding the disruption nodes into the passenger connection network.

Figure 8:
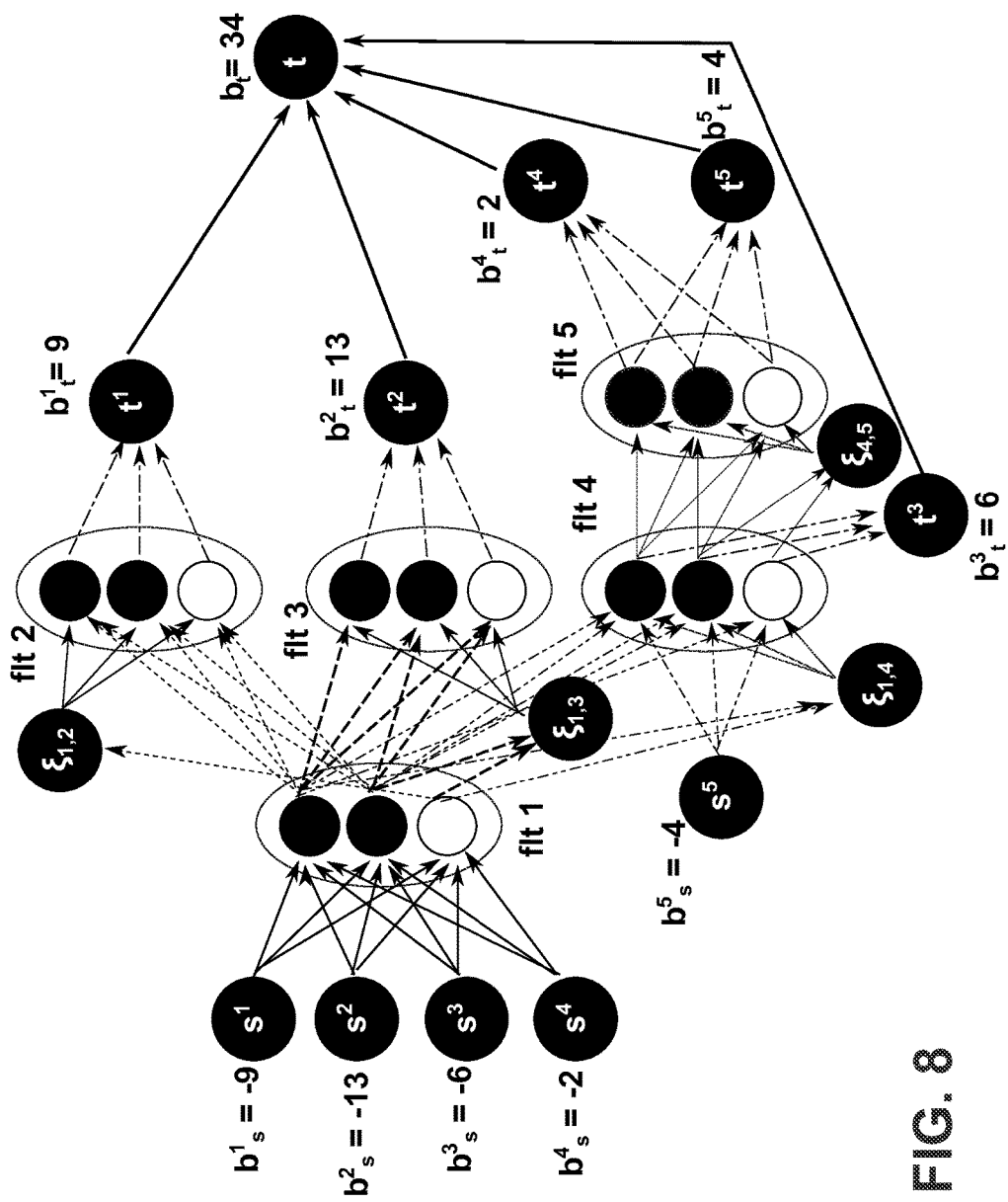
FIG. 8 illustrates a passenger connection network applied to the flight network of FIG. 6 according to an embodiment of the invention.
Figure 9:
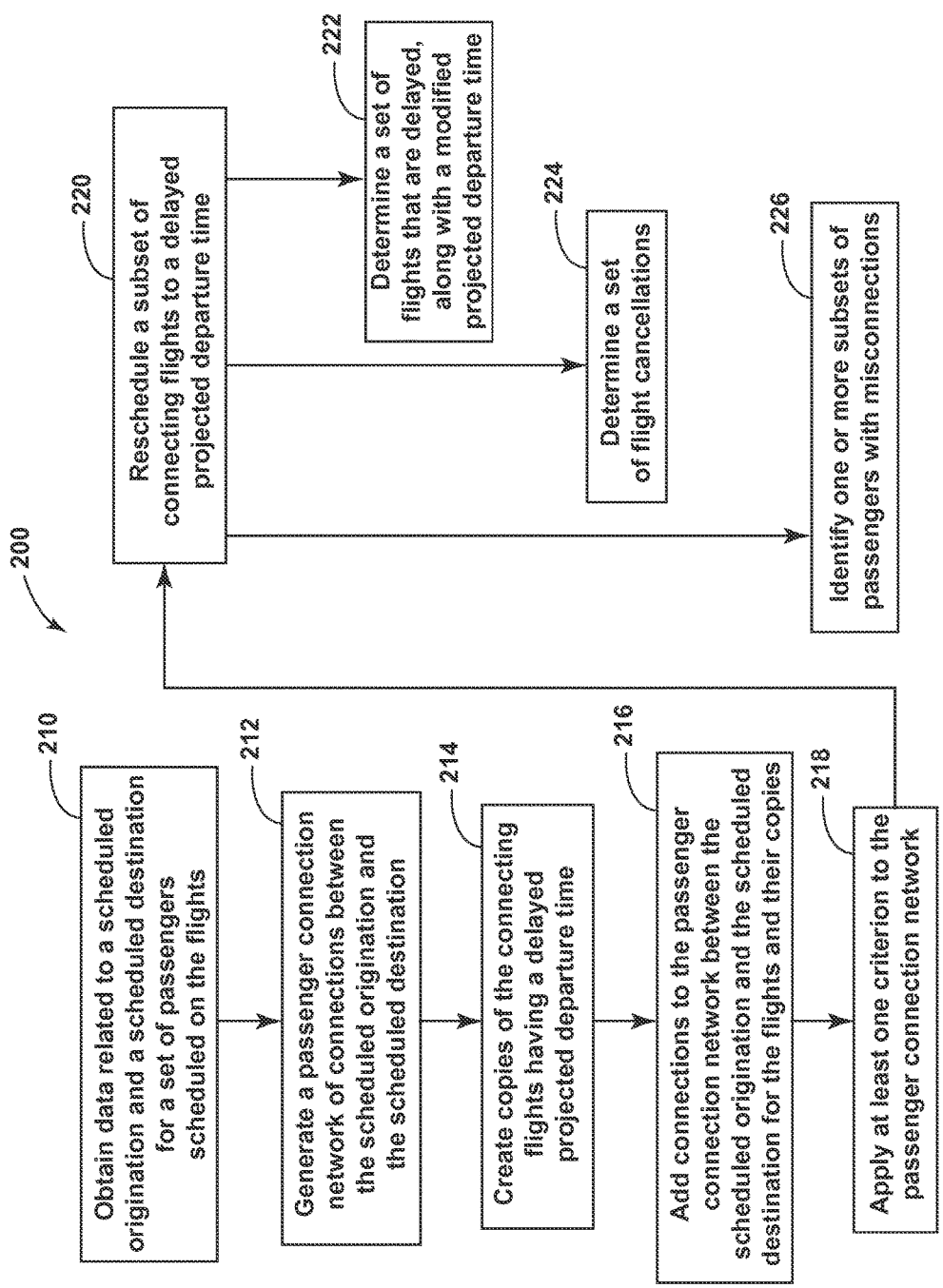
FIG. 9 is a flow chart illustrating a method of rescheduling flights affected by a disruption according to an embodiment of the invention.

FIG. 8 illustrates an expansion of the passenger connection network for the example flight network presented in FIGS. 6 and 7. Selecting the set of delays and cancellations for even a simple flight network to mitigate passenger disruption escalates into a complex process even when the processor allows for a single delay for the flights in the network. The flight disruption component or the modeling component includes the source nodes $b_s^1, b_s^2, b_s^3, b_s^4, b_s^5$ to represent the passengers at their origination as described by the itineraries shown in TABLE 1. The flight disruption component or the modeling component models the flights (flight 1-flight 5) to include a node for the scheduled time, a single delay time, and a cancellation node. The connection between flights includes the connecting arcs and an intermediate disruption node to track passengers with disrupted itineraries. The flight disruption component or the modeling component includes the sink nodes $b_t^1, b_t^2, b_t^3, b_t^4, b_t^5$ to represent the passengers at their destination as described by the itineraries shown in TABLE 1. Finally, the flight disruption component or the modeling component connects the sink nodes to the super sink node $b_t$ to account for the 34 passengers in the passenger connection network. As described above, the network solver component solves the network flow problem associated with the passenger connection network to reschedule flights by enforcing delays and cancellations that mitigate passenger disruption across the network. Referring now to FIG. 9, a flowchart depicting a method 200 of rescheduling flights affected by a disruption according to an embodiment of the invention is illustrated. The method as implemented by a processor includes a first step 210 whereby the processor obtains data related to a scheduled origination and a scheduled destination for a set of passengers scheduled on the flights in a flight network. The processor in a second step 212 generates a passenger connection network of connections between the scheduled origination and the scheduled destination for a subset of the set of passengers. The connections include at least one connecting flight that is not direct between the scheduled origination and the scheduled destination. Initially, the connecting flight has a first projected departure time. The processor at step 214 creates at least one intermediate alternative of the connecting flights, with the intermediate alternatives having a second projected departure time that is later than the first projected departure time. The processor adds connections to the passenger connection network between the scheduled origination and the scheduled destination for the subset of the set of passengers at step 216. The processor applies at least one criterion to the passenger connection network with the added connections at step 218. At step 220, the processor then solves the network flow problem to reschedule a subset of connecting flights to have a delayed projected departure time that improves the flow of passengers through the flight network. The processor can output data related, but not be limited to, the set of delayed flights 222 along with modified projected departure times, a set of flight cancellations 224 and a set of passengers with missed connections 226.

Technical effects of the above-described embodiments include outputting a passenger-centric operations recovery solution that minimizes passenger inconveniences due to misconnections, inbound delays and stranding passengers at certain stations. By determining an improved flight delay or departure time, embodiments of the method and system provide rescheduling options for disrupted passengers using pre-existing scheduled flights without re-routing passengers. The method and system presented is amenable to airlines that make operational decisions centered on passenger metrics. Passenger modeling within an operations recovery environment is a computational challenge, and the above-described embodiments of the system and method have been shown through experimental simulation to provide a solution to a complex problem in an efficient manner and consequently provide a commercial advantage. To wit, by providing efficient and better overall solutions for operations recovery, embodiments of the system and method described above ultimately lower the financial cost to an airline during a disruption event. The model and constraints presented above focus primarily on the passenger connectivity and ignore many other constraints that define the operational decisions. The system and methods described above are readily appended to existing models and structures to better enhance operational recovery solver systems.

To the extent not already described, the different features and structures of the various embodiments can be used in combination with each other as desired. That one feature cannot be illustrated in all of the embodiments is not meant to be construed that it cannot be, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system configured to analyze flight rescheduling options for airline passengers, comprising:
    a memory for storing flight origination and flight destination data for each of the airline passengers; and
    a flight modeling module configured for receiving the stored flight origination and flight destination data, the flight modeling module mapping connections between the flight origination data and the flight destination data to produce a passenger flight connection simulation model, and based on the passenger flight connection simulation model, update a flight schedule for a subset of flights;
    wherein the passenger flight connection simulation model includes (i) a plurality of flight legs representative of scheduled flights, (ii) a plurality of nodes for associating the passenger with the flight legs, and (iii) a plurality of arcs, each arc connecting two or more of the nodes; and
    wherein the subset of flights are flown in accordance with the updated flight schedule.

2. The system of claim 1, further comprising a network solver module for (i) analyzing the passenger flight connection simulation model and (ii) determining passenger flight rescheduling options responsive to the analysis.

3. The system of claim 2, wherein the flight rescheduling options include at least one from the group including flying, delaying a flight, canceling a flight, and routing passengers in accordance therewith.

4. The system of claim 2, wherein the determining includes applying at least one criterion to the passenger flight connection simulation model.

5. The system of claim 4, wherein the criterion includes at least one from the group including airline fuel costs, overall airline fuel costs, average per flight departure delay duration, preflight revenue, overall flight revenue, a total number of flight cancellations, and total flight disruptions for a pre-determined set of passengers.

6. The system of claim 1, wherein the flight modeling module includes (i) a flight disruption component that receives the stored flight origination and flight destination data and (ii) a modeling component that maps the connections and produces the passenger flight connection simulation model.

7. The system of claim 6, further comprising a decomposition component for decomposing the passenger connection network model into connected components.

8. The system of claim 7, further comprising a rescheduling component for rescheduling airline flights based upon the analyzing and the determining performed within the network solver module.

9. The system of claim 1, wherein the nodes are formed of one or more source nodes, inbound flight nodes, departure flight nodes, cancellation nodes, disruption nodes, and sink nodes.

10. The system of claim 9, wherein one or more of the inbound flight nodes and the departure flight nodes are intermediate alternatives of corresponding flight legs.

11. A tangible computer-readable medium having stored thereon, computer-executable instructions that, if executed by a computing device, cause the computing device to:
    receive stored flight origination and flight destination data for each of a plurality of airline passengers;
    map connections between the flight origination data and the flight destination data to produce a passenger flight connection simulation model; and
    update a flight schedule for a subset of flights based upon the passenger flight connection simulation model;
    wherein the passenger flight connection simulation model includes (i) a plurality of flight legs representative of scheduled flights, (ii) a plurality of nodes for associating the passenger with the flight legs, and (iii) a plurality of arcs, each arc connecting two or more of the nodes; and
    wherein the subset of flights are flown in accordance with the updated flight schedule.

12. The tangible computer-readable medium of claim 11, further causing the computing device to analyze the passenger connection network model and determine passenger flight rescheduling options responsive to the analysis.

13. The tangible computer-readable medium of claim 12, wherein the flight rescheduling options include at least one from the group including flying, delaying a flight, canceling a flight, and routing passengers in accordance therewith.

14. The tangible computer-readable medium of claim 12, wherein the determining includes applying at least one criterion to the passenger flight connection simulation model.

15. The tangible computer-readable medium of claim 14, wherein the criterion includes at least one from the group including airline fuel costs, overall airline fuel costs, average per flight departure delay duration, preflight revenue, overall flight revenue, a total number of flight cancellations, and total flight disruptions for a pre-determined set of passengers.

16. The tangible computer-readable medium of claim 11, wherein the passenger flight connection simulation model includes (i) a flight disruption component that receives the stored flight origination and flight destination data and (ii) a modeling component that maps the connections and forms the passenger flight connection simulation model.

17. The tangible computer-readable medium of claim 11, wherein the nodes are formed of one or more source nodes, inbound flight nodes, departure flight nodes, cancellation nodes, disruption nodes, and sink nodes.

18. The tangible computer-readable medium of claim 17, wherein one or more of the inbound flight nodes and the departure flight nodes are intermediate alternatives of corresponding flight legs.

* * * * *